US007003210B2

(12) United States Patent
Depovere et al.

(10) Patent No.: US 7,003,210 B2
(45) Date of Patent: Feb. 21, 2006

(54) DISPLAY DEVICE COMPRISING AN OPTICAL WAVEGUIDE PLATE AND METHOD OF OPERATING FOR THE SAME

(75) Inventors: Geert Florimond Gerard Depovere, Eindhoven (NL); Sebastiaan De Bont, Eindhoven (NL); William Peter Mechtildis Marie Jans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 45 days.

(21) Appl. No.: 10/496,418

(22) PCT Filed: Nov. 12, 2002

(86) PCT No.: PCT/IB02/04774

§ 371 (c)(1), (2), (4) Date: May 21, 2004

(87) PCT Pub. No.: WO03/046878

PCT Pub. Date: Jun. 5, 2003

(65) Prior Publication Data

US 2005/0013582 A1 Jan. 20, 2005

(30) Foreign Application Priority Data

Nov. 26, 2001 (EP) ................................. 01204541

(51) Int. Cl.
*G02B 6/00* (2006.01)

(52) U.S. Cl. ........................ 385/147; 385/31; 385/901

(58) Field of Classification Search .................. 385/31, 385/147, 901
See application file for complete search history.

(56) References Cited

U.S. PATENT DOCUMENTS

| | | | | |
|---|---|---|---|---|
| 5,771,321 | A * | 6/1998 | Stern | 385/31 |
| 5,953,469 | A * | 9/1999 | Zhou | 385/22 |
| 6,249,370 | B1 * | 6/2001 | Takeuchi et al. | 359/291 |
| 6,452,583 | B1 * | 9/2002 | Takeuchi et al. | 345/108 |
| 6,525,483 | B1 * | 2/2003 | Van Gorkom et al. | 315/169.1 |
| 2003/0043449 | A1 * | 3/2003 | Takeuchi et al. | 359/290 |

* cited by examiner

*Primary Examiner*—Ellen E. Kim

(57) ABSTRACT

The display device (1) comprises picture elements (5) arranged in substantially parallel lines (6) on a display panel (2), and selection means (3) for controlling the decoupling of light from an optical waveguide plate at the picture elements. The selection means (3) are arranged for multiline addressing of the picture elements (5). For displaying gray scales, image information (4) is decomposed into a number of subfields (13) which are displayed. The time efficiency of the addressing of picture elements (5) in lines (16) in the subfields (13) is increased, enabling the display device (1) to display a relative large number of gray method of operating a display device (1) is carried out when the device is in operation.

10 Claims, 6 Drawing Sheets

Figure 1:
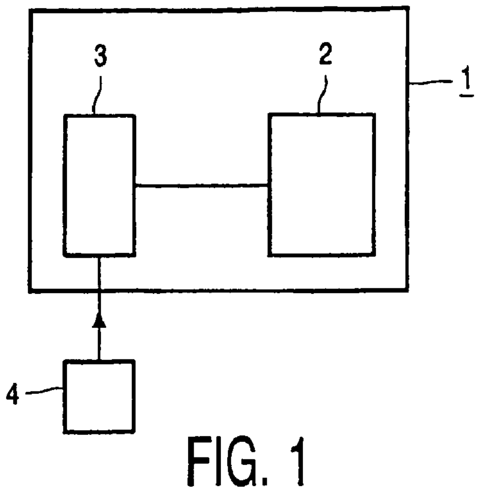

DISPLAY DEVICE COMPRISING AN OPTICAL WAVEGUIDE PLATE AND METHOD OF OPERATING FOR THE SAME

The invention relates to a display device as defined in the pre-characterizing part of Claim 1.

The invention also relates to a method of operating a display device as defined in the pre-characterizing part of Claim 9.

An embodiment of the display device of the type mentioned in the opening paragraph is known from WO 00/38163.

The known display device comprises a display panel having picture elements and selection means for addressing, i.e. activating and deactivating, the picture elements by applying voltages to the picture elements. A picture element is a location where light can be decoupled from an optical waveguide plate. Picture elements are arranged in substantially parallel lines of the display device. When a picture element is activated, a movable element is locally brought into contact with the optical waveguide plate and light is decoupled from the optical waveguide plate. The picture element remains in this state until the picture element is deactivated, i.e. the contact is interrupted, and vice versa. Picture elements are addressed one line at a time. Multiline operation can be applied, because more than one line can simultaneously be active.

The picture elements can only be active and inactive. In order to create gray levels at picture elements, the image information concerning an image is decomposed into a number of subfields. Picture elements arranged in a number of lines are displayed in consecutive lines in each subfield. These lines are part of the number of lines on the display device. Each subfield has its own predetermined number of active standard periods of time, i.e. periods of time in which picture elements arranged in a line are active after having been activated in an immediately preceding activating standard period of time, so as to be deactivated again in an immediately following deactivating standard period of time. Hereinafter standard period of time is also denoted as interval. A line is activated, meaning that picture elements arranged in the line are activated, in one interval and deactivated in one interval. By displaying all subfields consecutively in one frame time, the percentage of time during which light is decoupled from each picture element is regulated. In this way gray scales are created.

The execution of a subfield modulation scheme generates a sequence of activating, active, and deactivating intervals to activate, to keep active, and to deactivate picture elements arranged in lines. The sequence starts with an activating interval to activate a first line of a first subfield and ends with a deactivating interval to deactivate a last line of a last subfield.

A drawback of the known display device is that the sequence of activating, active, and deactivating intervals results in a time-inefficient addressing of the lines because intervals available for addressing are present in which no line is activated or deactivated. Therefore, relatively few gray scales can be displayed in one frame time. If the number of gray scales is relatively low, artifacts will appear in the image, substantially adversely affecting the image quality.

It is a first object of the invention to provide a display device of the kind mentioned in the opening paragraph which is able to display a relatively large number of gray scales.

It is a second object of the invention to provide a method of operating a display device of the kind mentioned in the opening paragraph, which enables the displaying of a relatively large number of grayscales.

The first object is achieved in that the display device in accordance with the invention is constructed as specified in Claim 1.

Under predetermined conditions of the predetermined number of active standard periods of time and the predetermined second number of lines, available intervals in the first subfield are not used for activating a line because activation of a first line in a second subfield is started after the deactivation of a last line in the first subfield. The inventors have realized that in this way available intervals in the first subfield are not used for activating a line. It can now be achieved that the activation of a first line in the second subfield starts already after the activation of a last line in the first subfield. In this way gray scales are displayed in a time-efficient way. It is not always possible to activate a first line in the second subfield immediately in the next consecutive interval after activating a last line in the first subfield. This depends on the predetermined number of active intervals and the number of lines remaining to be deactivated in the first subfield. As a result, it may happen that deactivating of a line in the second subfield will coincide with deactivating of a line in the first subfield. In this case the activation of a first line in the second subfield must be postponed for one or more intervals to avoid this coincidence. Some time-efficiency is lost in this way.

Using this insight, one or a number of advantages can be obtained. The number of gray scales can be increased, and/or the length of the interval can be increased, and/or the frame time can be decreased, and/or the number of lines can be increased.

An embodiment of the display device in accordance with the invention is claimed in Claim 2. In this case the predetermined number of active intervals of the first subfield incremented by one is less than the number of lines. Now active lines have to be deactivated before a last line in the first subfield is activated. If, furthermore, the second number of lines is unequal to an integer divisor of the predetermined number of active intervals of the first subfield incremented by one, available intervals in the first subfield are used for activating a line in the second subfield. It is not always possible to activate a first line in the second subfield immediately in the next consecutive interval after activating a last line in the first subfield. This depends on the predetermined number of active intervals in the first subfield, the predetermined number of active intervals in the second subfield, and the number of lines remaining to be deactivated in the first subfield.

A special embodiment of the display device in accordance with the invention is claimed in Claim 3. Electrodes are simple and reliable.

An embodiment of the display device in accordance with the invention is claimed in Claim 4. A possible coincidence of deactivating of a first line in the second subfield with deactivating of a line in the first subfield is avoided by arranging the subfields in order of increasing predetermined number of intervals. Before a first line in the second subfield has to be deactivated, a last line in the first subfield has already been deactivated. The activation of a first line in the second subfield now appears in the next interval after activation of a last line in the first subfield. This way of addressing is very time-efficient.

A modification of the preceding embodiment is claimed in Claim 5. In binary weighted subfields the predetermined number of active intervals in a subfield equals a power of two, giving the largest number of gray scales for the lowest number of subfields. Now the image information is decomposed bit-wise, which is well-suited for displaying and manipulating the image information.

An embodiment of the display device in accordance with the invention is claimed in Claim 6. This embodiment enables the application of subfield modulation schemes generating a regular sequence of activating, active, and deactivating intervals, resulting in a time-efficient addressing of the lines.

A special embodiment of the preceding embodiment is claimed in Claim 7. The activating intervals are separated by an odd number of intervals. Now there is no need for a fixed order of bits, and furthermore a regular sequence of activating, active, and deactivating intervals is generated, at the cost of some time efficiency. In between the activating interval for activating a line and the activating interval for activating a next consecutive line there is one unused interval. Except in the start and the end phase of the sequence, the unused intervals are filled with deactivating intervals. This is due to the constraint that the predetermined number of active intervals of all subfields is even. A collision of activating and deactivating intervals is avoided thereby. The ordering of the activating and deactivating intervals is very smooth and deterministic. The generation of the sequence of activating, active, and deactivating intervals can thus be readily realized in hardware.

A special embodiment of the previous embodiment is claimed in Claim 8. Compared with the previous embodiment, the activating intervals are separated by one interval, and therefore this embodiment is the most time-efficient one of the embodiments as claimed in Claim 7.

The second object is achieved in that the method of operating a display device in accordance with the invention is arranged as specified in Claim 9.

A special embodiment is claimed in Claim 10.

Figure 2A:
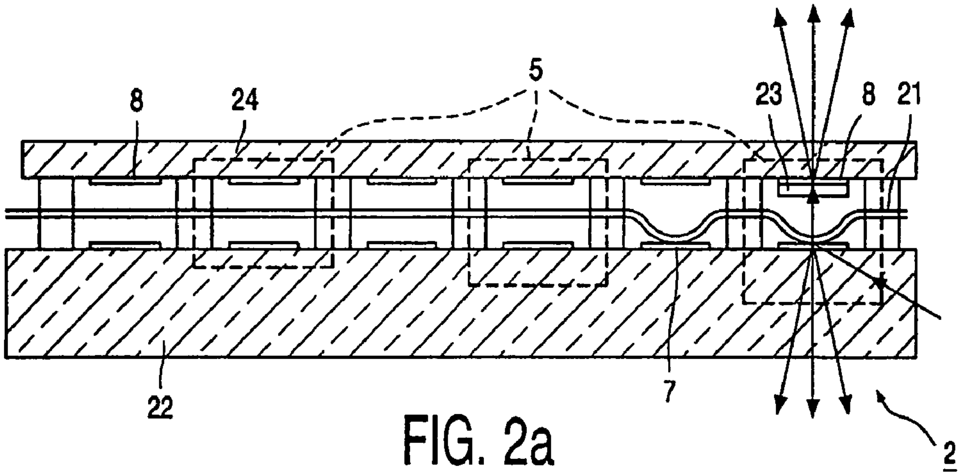
Figure 2B:
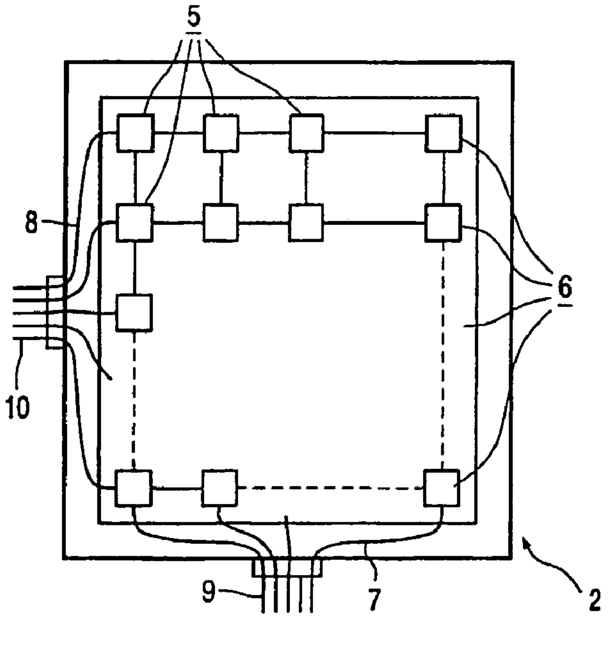
Figure 3:
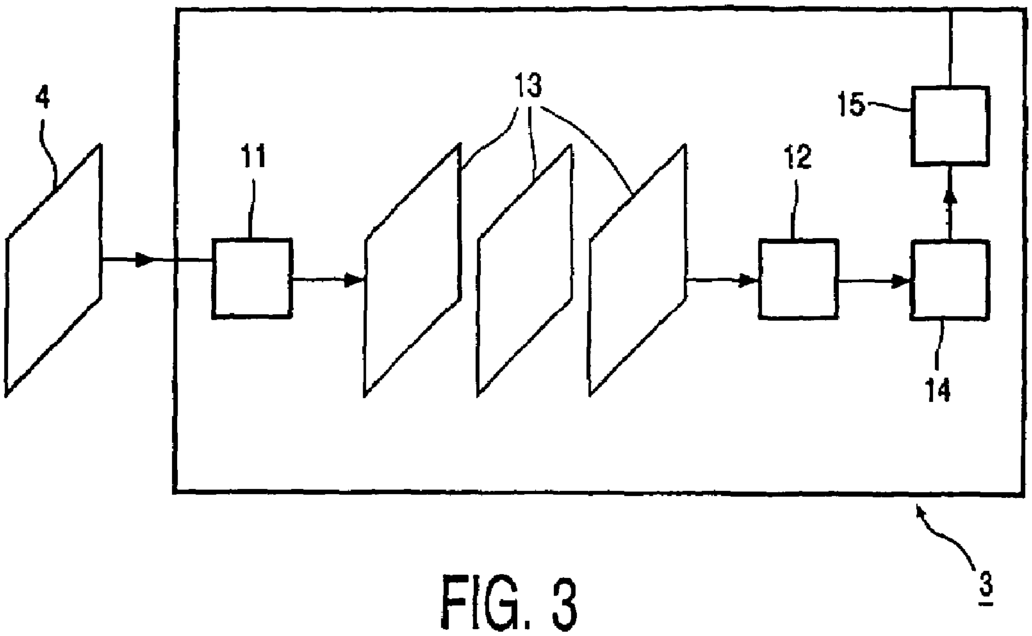
Figure 4:
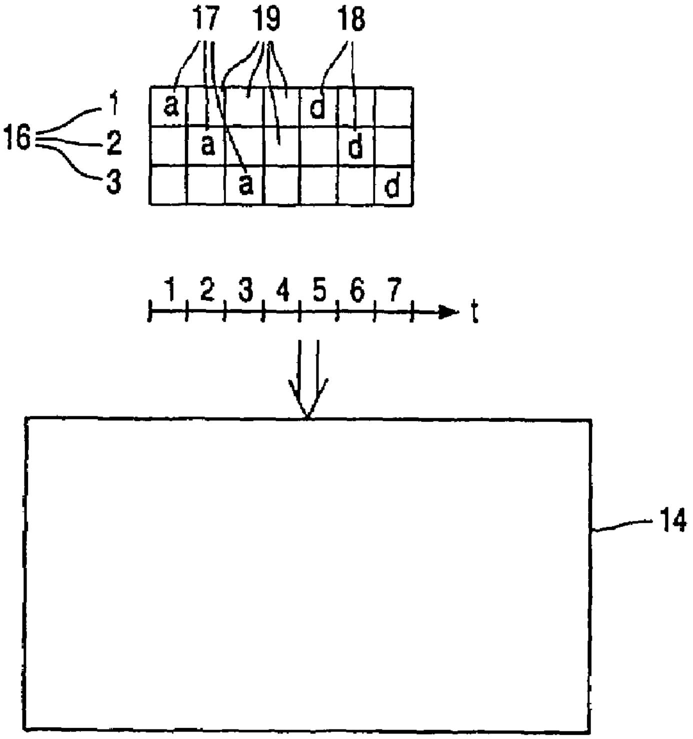
Figure 5:
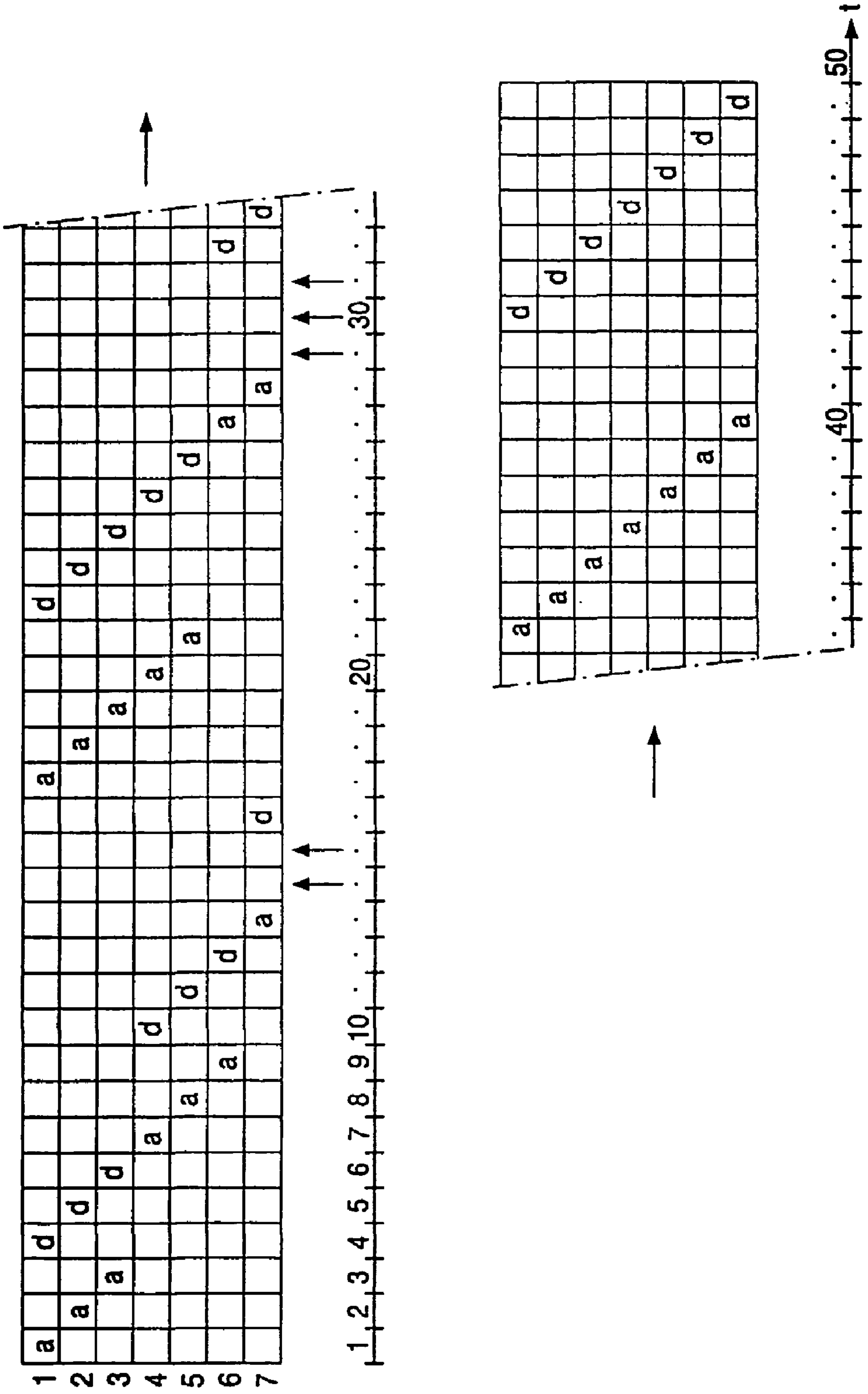
Figure 6:
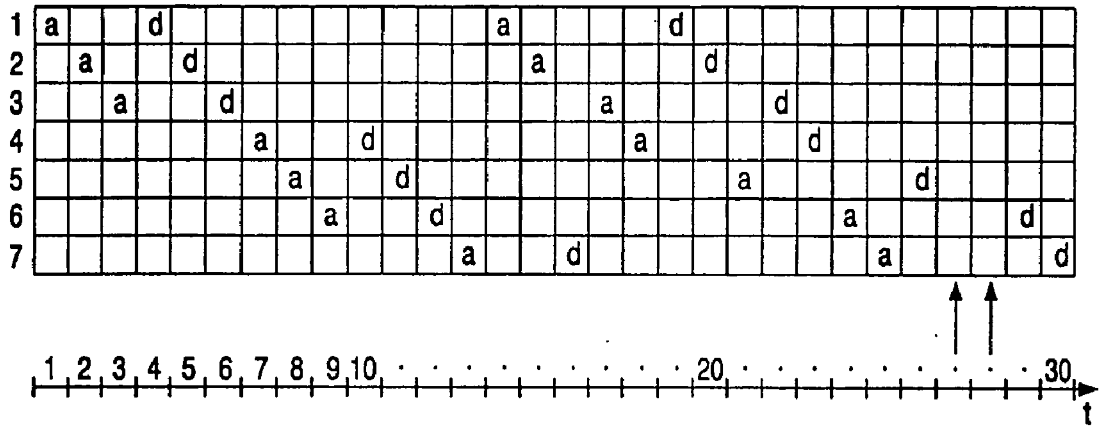
Figure 7:
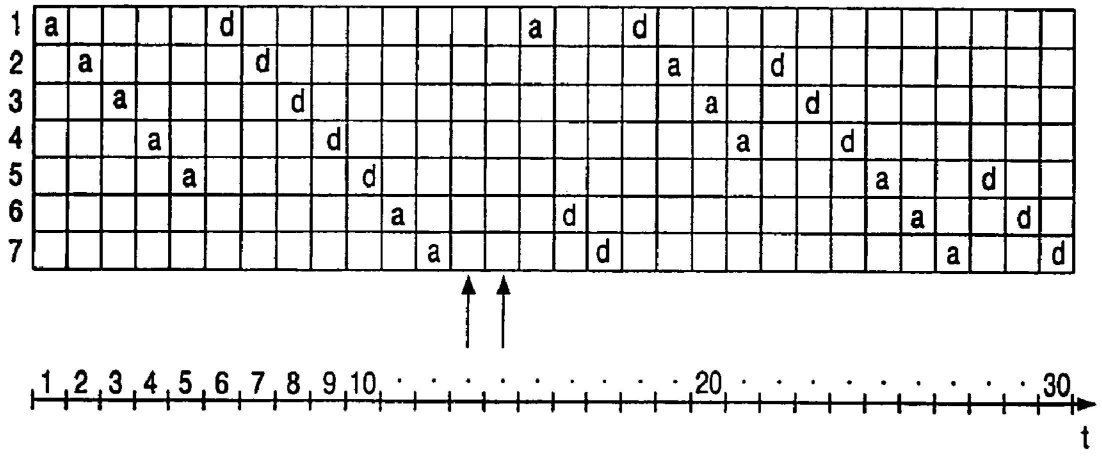
Figure 8:
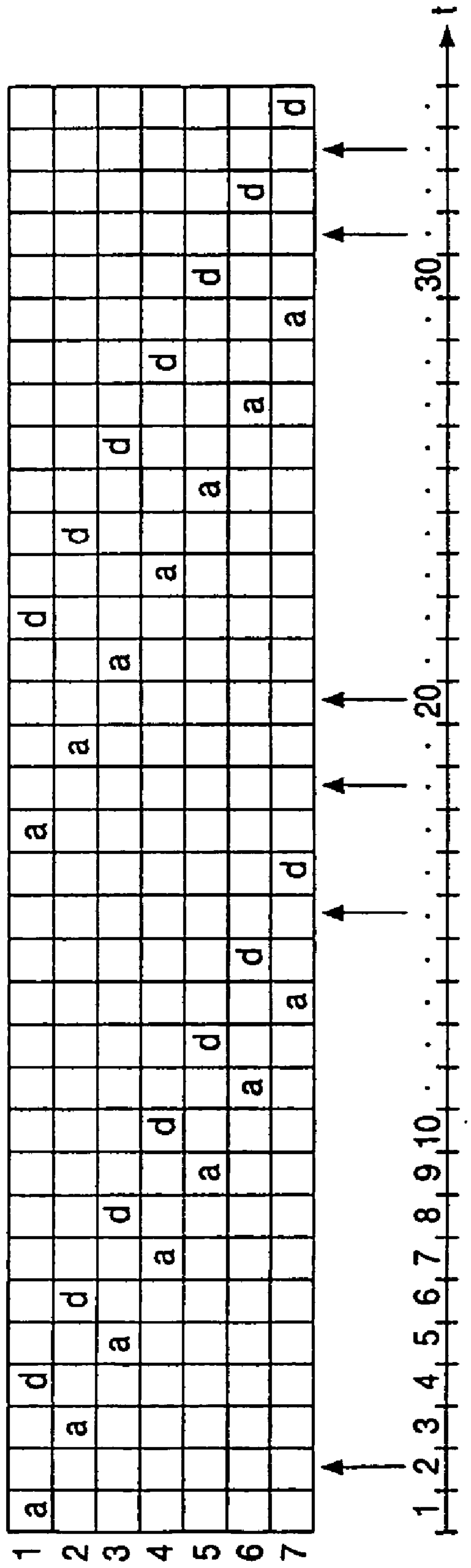
Figure 9:
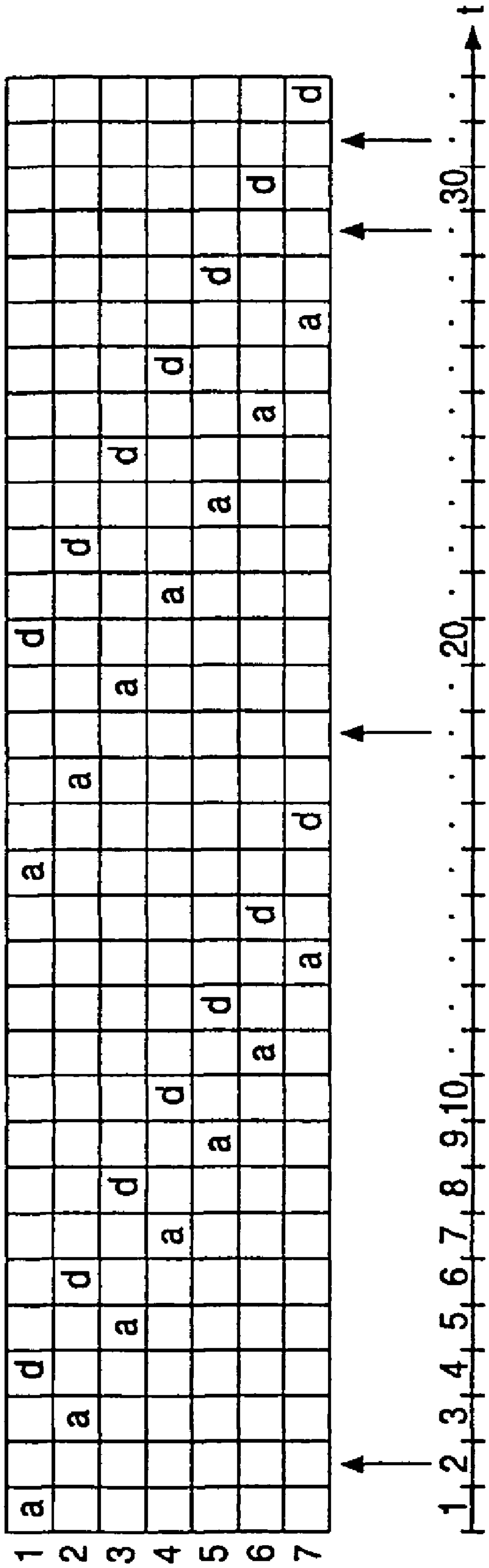

These and other aspects of the invention will be further elucidated and described with reference to the drawings, in which:

FIG. 1 schematically shows the display device;

FIG. 2*a* is a diagrammatic cross-sectional view of the display panel;

FIG. 2*b* is a diagrammatic front elevation of the display panel;

FIG. 3 schematically shows the operating principle of the selection means;

FIG. 4 schematically illustrates a subfield modulation scheme and the sequence of activating, active, and deactivating intervals, not according to the invention;

FIG. 5 schematically illustrates a subfield modulation scheme for seven lines, including three subfields, not according to the invention;

FIG. 6 schematically illustrates a first time-efficient subfield modulation scheme for seven lines, including two subfields;

FIG. 7 schematically illustrates a second time-efficient subfield modulation scheme for seven lines, including two subfields;

FIG. 8 schematically illustrates a regular and time-inefficient subfield modulation scheme for seven lines, including two subfields, not according to the invention; and FIG. 9 schematically illustrates a regular and time-efficient subfield modulation scheme for seven lines, including two subfields.

The Figures are schematic and not drawn to scale, and the same reference numerals refer to corresponding parts in all Figures.

In FIG. 1 the display device 1 comprises a display panel 2 and selection means 3. Using image information 4 as an input, the selection means 3 are able to apply voltages to the display panel 2, representing the image information 4.

In FIG. 2*a* the display panel 2 comprises an optical waveguide plate 22, a movable element 21, and a second plate 24. Electrodes 7 and 8 are arranged, respectively, on the mutually facing surfaces of the optical waveguide plate 22 and on the second plate 24 facing the movable element 21. A local generation of a potential difference between the electrodes 7, 8 and the movable element 21 by applying, in operation, voltages to the electrodes 7, 8 and the movable element 21 causes forces to be locally exerted on the movable element 21, which forces pull the movable element 21 against the optical waveguide plate 22 or against the second plate 24, depending on the applied voltages. Light generated by a lamp is coupled into the optical waveguide plate 22. The light travels inside the optical waveguide plate 22 and, due to internal reflection, cannot escape from the optical waveguide plate 22 unless the situation as shown in FIG. 2*a* occurs. FIG. 2*a* shows the movable element 21 locally lying against the optical waveguide plate 22. In this state, part of the light enters the transmissive movable element 21. The movable element 21 scatters the light, so that it leaves the display device 1: light is decoupled from the optical waveguide plate 22 at picture element 5. The light can exit at both sides or at one side, as indicated in FIG. 2*a* by means of arrows. The display panel 2 may comprise color determining elements 23. These elements 23 may be, for example, color filters allowing light of a specific color (red, green, blue, etc.) to pass. FIG. 2*b* is a diagrammatic front elevation of the display panel 2 having picture elements 5 arranged in substantially parallel lines 6. Electrodes 7 and 8 are present for applying voltages to the picture elements 5 via the connections 9 and 10.

In FIG. 3 the image information 4 is decomposed into a number of subfields 13 by processing means 11. Processing means 12 execute a subfield modulation scheme which generates a sequence 14 of activating, active, and deactivating intervals. This sequence 14 is input for a selection voltage generator 15 which applies voltages to the picture elements 5, as the selection voltage generator 15 is connected to the connections 9 and 10 of the display panel 2. The processing means 11 and 12 and the selection voltage generator 15 may be separate components or be integrated into one or two components.

FIG. 4 shows the activating intervals 17, the deactivating intervals 18, and the active intervals 19 in a subfield 13 in which picture elements 5 arranged in a number of lines 16 are activated, remain active, and are deactivated for a subfield modulation scheme not according to the invention. The lines 16 are addressed consecutively. Furthermore, the consecutive numbering of intervals in time t and the sequence 14 of activating, active, and deactivating intervals are shown. The sequence 14 consists of (interval 1: activate line 1; interval 2: activate line 2; interval 3: activate line 3; interval 4: no addressing; interval 5: deactivate line 1; interval 6: deactivate line 2; interval 7: deactivate line 3).

FIG. 5 shows the activating intervals 17 and the deactivating intervals 18 for a subfield modulation scheme, not according to the invention, for seven lines 16 and three subfields 13 containing 2, 4 and 8 active intervals, respectively. Displaying of the first subfield accounts for 16, the second for 17, and the third for 16 intervals. The total time used for displaying these three subfields is 49 intervals. The arrows show five intervals available for activating or deactivating a line, but not used because of the restriction that activating of a first line in a subfield takes place after deactivating of a last line in the preceding subfield. All 7 lines are active in the two intervals numbered 41 and 42. Therefore, these two intervals are not available for addressing. It is clear that if the second number of lines is smaller than the predetermined number of intervals in a subfield, the efficiency of the addressing of the lines resulting from the sequence 14 of activating, active, and deactivating intervals generated by the execution of the subfield modulation scheme cannot be increased. In short this is denoted as: the time efficiency of the subfield modulation scheme cannot be increased. If case only the first six lines are present and only the first subfield is considered, the number of lines, six, equals an integer divisor of the number of active intervals 19, 2. FIG. 5 clearly shows that all intervals in this subfield 13 are then used for activating or deactivating a line 16. The time efficiency cannot be increased in this case.

In the next Figures the subfield modulation scheme of the first two subfields of FIG. 5, addressing seven lines, is compared with other subfield modulation schemes. Displaying the first two subfields in FIG. 7 takes 33 intervals, including five intervals not used for addressing.

FIG. 6 shows a subfield modulation scheme. A first line 16 in the second subfield 13 is already activated in the next interval subsequent to the activation of a last line 16 in the first subfield 13. Displaying these two subfields 13 takes 30 intervals, three intervals less than the subfield modulation scheme presented in FIG. 5. Now only 2 intervals, indicated by arrows, are not used for activating or deactivating. However, these two intervals can be used if a third subfield 13 is present.

In FIG. 7 only the order of the subfields is reversed compared with FIG. 6. For these two subfields 13, the subfield modulation scheme is equally time-efficient as with the scheme shown in FIG. 6. However, the subfield modulation scheme presented in FIG. 6 has 2 intervals that can be used in a next subfield 13. This is not the case for the subfield modulation scheme presented in FIG. 7. The reason is that activation of a first line 16 in the second subfield 13 cannot take place in the interval immediately following the activation of a last line 16 in the first subfield 13 because the deactivation of said two lines 16 would then take place in the same interval. This is not possible. Therefore, activating a first line 16 in the second subfield 13 must be postponed for 2 intervals as shown in FIG. 7.

FIG. 8 schematically shows the subfield modulation scheme, not according to the invention, for the case in which the activating intervals 17 are separated by an even number of intervals. A first line 16 in the second subfield 13 is activated after a last line 16 in the preceding subfield 13 is deactivated. Displaying these two subfields 13 takes 34 intervals, and the arrows show that 6 intervals are available but not used for addressing. This is a time-inefficient subfield modulation scheme. In FIG. 9 the aforementioned subfield modulation scheme is applied. Now a first line 16 in the second subfield 13 can be activated after activation of a last line in the first subfield 13. Displaying these two subfields 13 takes 32 intervals, and now only 4 intervals, indicated by arrows, are available for addressing but not used. Notice that the execution of the subfield modulation scheme generates a sequence 14 of activating, active, and deactivating intervals resulting in a very regular addressing of the lines 16. Furthermore, the two intervals 29 and 31 can be used if a third subfield 13 is present. Activating a first line 16 in the third subfield 13 can take place in interval 29 or 31. Activating a first line 16 in interval 29 is more time-efficient.

It will be obvious that many variations are possible within the scope of the invention without departing from the scope of the appended claims.

What is claimed is:

1. A display device (1) for displaying image information (4) comprising:

a display panel (2) comprising an optical waveguide plate (22), a second plate (24) facing the optical waveguide plate (22), a movable element (21) between the optical waveguide plate (22) and the second plate (24), and picture elements (5) for decoupling light from the optical waveguide plate (22) through local contact of the movable element (21) with the optical waveguide plate (22), said picture elements (5) being arranged in a predetermined first number of substantially parallel lines (6); and selection means (3) arranged for multiline addressing of the picture elements (5) arranged in a predetermined second number of lines (6), forming part of the predetermined first number of substantially parallel lines (6), and comprising processing means (11,12) arranged for:

decomposing the image information (4) into a number of subfields (13) to be displayed, each subfield (13) having its own predetermined number of active standard periods of time (19) per line (16); and executing a subfield modulation scheme by generating a sequence (14) of activating, active, and deactivating standard periods of time, said sequence (14) comprising:

in a first subfield (13), an activating and a deactivating standard period of time (17,18) to activate and to deactivate picture elements (5) arranged in a last line (16) of the predetermined second number of lines; and in a second consecutive subfield (13), an activating and a deactivating standard period of time (17, 18) to activate and to deactivate picture elements (5) arranged in a first line (16) of the predetermined second number of lines, characterized in that the activating standard period of time (17) for activating the picture elements (5) arranged in the first line (16) in the second consecutive subfield (13) is substantially a next consecutive standard period of time after the activating standard period of time (17) for activating the picture elements (5) arranged in the last line (16) of the first subfield (13), under predetermined conditions of the predetermined number of active standard periods of time and the predetermined second number of lines.

2. A display device (1) as claimed in claim 1, characterized in that the predetermined conditions comprise that the predetermined number of active standard periods of time of the first subfield (13) incremented by one is less than the predetermined second number of lines, and the predetermined second number of lines is unequal to an integer divisor of the predetermined number of active standard periods of time of the first subfield (13) incremented by one.

3. A display device (1) as claimed in claim 2, characterized in that the subfields (13) are arranged in order of increasing predetermined number of active standard periods of time.

4. A display device (1) as claimed in claim 3, characterized in that the predetermined numbers of active standard periods of time of all subfields (13) are each a power of two.

5. A display device (1) as claimed in claim 2, characterized in that the predetermined numbers of active standard periods of time of all subfields (13) are even.

6. A display device (1) as claimed in claim 5, characterized in that the activating standard periods of time (17) for activating picture elements (5) arranged in the predetermined second number of lines are separated by an odd number of standard periods of time.

7. A display device (1) as claimed in claim 6, characterized in said odd number of standard periods of time is one.

8. A display device (1) as claimed in claim 1, characterized in that the selection means (3) comprise a first set of electrodes (7) and a second set of electrodes (8) crossing the first set of electrodes (7).

9. A method of operating a display device (1) for displaying image information (4), the display device (1) comprising:

a display panel (2) comprising an optical waveguide plate (22), a second plate (24) facing the optical waveguide plate (22), a movable element (21) between the optical waveguide plate (22) and the second plate (24), and picture elements (5) for decoupling light from the optical waveguide plate (22) through local contact of the movable element (21) with the optical waveguide plate (22), the picture elements (5) being arranged in a predetermined first number of substantially parallel lines (6); and selection means (3) arranged for multiline addressing the picture elements (5) arranged in a predetermined second number of lines (6), forming part of the predetermined first number of substantially parallel lines (6), and comprising processing means (11,12), which method comprises:

a step of decomposing the image information (4) into a number of subfields (13);

a step of displaying the subfields (13);

a step of multiline addressing of the predetermined second number of lines in each subfield (13), each subfield (13) having its own predetermined number of active standard periods of time (19) per line (16), and a step of executing a subfield modulation scheme, comprising:

a sub-step of activating or deactivating, as applicable, picture elements (5) arranged in a last line (16) of the predetermined second number of lines in a first subfield (13); and a sub-step of activating or deactivating, as applicable, picture elements (5) arranged in a first line (16) of the predetermined second number of lines in a second consecutive subfield (13), characterized in that the sub-step of activating the picture elements (5) arranged in the first line (16) in the immediately following second subfield (13) is carried out in substantially a next consecutive standard period of time after the sub step of activating the picture elements (5) arranged in the last line (16) of the first subfield (13), under predetermined conditions of the predetermined number of active standard periods of time and the predetermined second number of lines.

10. A method of operating a display device (1) as claimed in claim 9, characterized in that said predetermined conditions comprise that the predetermined number of active standard periods of time of the first subfield (13) incremented by one is less than the predetermined second number of lines, and the predetermined second number of lines is unequal to an integer divisor of the predetermined number of active standard periods of time of the first subfield (13) incremented by one.

* * * * *